US012633691B2

(12) United States Patent
Xu et al.

(10) Patent No.: US 12,633,691 B2
(45) Date of Patent: May 19, 2026

(54) EXPANSION CARD ASSEMBLY AND CONNECTOR

(71) Applicant: ASUSTeK COMPUTER INC., Taipei City (TW)

(72) Inventors: Chao Xu, Taipei City (TW); Wenqiao Yin, Taipei City (TW); Yuan-Yu Lin, Taipei City (TW)

(73) Assignee: ASUSTeK COMPUTER INC., Taipei City (TW)

(*) Notice: Subject to any disclaimer, the term of this patent is extended or adjusted under 35 U.S.C. 154(b) by 460 days.

(21) Appl. No.: 17/960,826

(22) Filed: Oct. 6, 2022

(65) Prior Publication Data

US 2023/0268681 A1 Aug. 24, 2023

(30) Foreign Application Priority Data

Feb. 23, 2022 (CN) ......................... 202220373409.8

(51) Int. Cl.

| | |
|---|---|
| ***H01R 12/72*** | (2011.01) |
| ***H01R 12/71*** | (2011.01) |
| ***H01R 13/627*** | (2006.01) |
| *H01R 12/75* | (2011.01) |
| *H01R 13/533* | (2006.01) |

(52) U.S. Cl.

CPC ......... *H01R 12/724* (2013.01); *H01R 12/712* (2013.01); *H01R 13/627* (2013.01); *H01R 12/71* (2013.01); *H01R 12/72* (2013.01); *H01R 12/721* (2013.01); *H01R 12/75* (2013.01); *H01R 13/533* (2013.01); *H01R 2201/06* (2013.01)

(58) Field of Classification Search

CPC .... H01R 12/724; H01R 12/712; H01R 12/71; H01R 12/72; H01R 12/721; H01R 13/533; H01R 2201/06; H01R 12/75; H01R 13/327; H01R 13/627

See application file for complete search history.

(56) References Cited

U.S. PATENT DOCUMENTS

| | | | | |
|---|---|---|---|---|
| 9,543,706 | B2 * | 1/2017 | Zhang | H01R 12/724 |
| 10,886,649 | B1 | 1/2021 | Yang et al. | |

(Continued)

FOREIGN PATENT DOCUMENTS

| | | | | |
|---|---|---|---|---|
| CN | 205565212 | | 9/2016 | |
| CN | 110729594 | | 1/2020 | |
| EP | 2635098 | A1 * | 9/2013 | H01R 12/721 |

*Primary Examiner* — Justin M Kratt
(74) *Attorney, Agent, or Firm* — JCIPRNET

(57) ABSTRACT

An expansion card assembly, including an expansion card body and a connector. The expansion card body includes a notch recessed into an edge thereof. The connector includes a housing. The housing includes a top surface, a bottom surface, and an engaging portion disposed on the bottom surface. The bottom surface is close to the expansion card body. The engaging portion is exposed out of the notch. The engaging portion connects the connector with an external power cord. A user operates the engaging portion at the bottom surface of the housing of the connector with fingers. Therefore, the expansion card assembly and the connector solve the problem that the too narrow space between the top surface of the housing and the other components makes it difficult for the user to stretch fingers into the space between the top surface of the housing and the other component.

6 Claims, 5 Drawing Sheets

(56) References Cited

U.S. PATENT DOCUMENTS

| | | | | |
|---|---|---|---|---|
| 2002/0019154 | A1* | 2/2002 | Na | H05K 1/147<br>439/76.1 |
| 2011/0069456 | A1* | 3/2011 | Brandon | H05K 1/0203<br>439/64 |
| 2019/0097336 | A1* | 3/2019 | Toh | H01R 13/405 |
| 2023/0049560 | A1* | 2/2023 | Fan | H01R 12/721 |

* cited by examiner

EXPANSION CARD ASSEMBLY AND CONNECTOR

CROSS-REFERENCE TO RELATED APPLICATION

This application claims the priority benefit of Chinese Application Serial No. 202220373409.8, filed on Feb. 23, 2022. The entirety of the above-mentioned patent application is hereby incorporated by reference herein and made a part of specification.

BACKGROUND OF THE INVENTION

Field of the Invention

The disclosure relates to an expansion card assembly and a connector.

Description of the Related Art

In an existing peripheral component interconnect express (PCI-E) connector, an engaging portion for connecting an external power cord is designed on a top surface of the connector close to a cooling fin, and a metal pin of the PCI-E connector close to the top surface is exposed to a housing of the connector. However, such a design of the engaging portion makes it difficult for the user to move fingers in the space between the top surface of the connector and the cooling fin when connecting or removing the external power cord. As a result, the user cannot easily connect the external power cord to or remove the external power cord from the PCI-E connector. In addition, the metal pin exposed out of the housing is likely to come into contact with the cooling fin to short circuit the discrete graphics card.

BRIEF SUMMARY OF THE INVENTION

According to an aspect of this disclosure, an expansion card assembly is provided. The expansion card assembly includes an expansion card body and a connector. The expansion card body includes a notch recessed into an edge thereof. The connector includes a housing. The housing includes a top surface, a bottom surface opposite to the top surface, and an engaging portion disposed on the bottom surface. The bottom surface is close to the expansion card body. The engaging portion is exposed out of the notch.

In one embodiment of the disclosure, the connector includes a plurality of pins running through the housing, the plurality of pins includes a first row of pins, and the first row of pins is closest to the top surface.

In one embodiment of the disclosure, the housing includes an extension portion extending from the top surface, and the extension portion covers the first row of pins.

In one embodiment of the disclosure, the connector is a PCI-E connector, the plurality of pins further includes a second row of pins and a third row of pins, and a number of pins in the first row of pins is less than a number of pins in the second row of pins and less than a number of pins in the third row of pins.

In one embodiment of the disclosure, each of the plurality of pins includes a first portion and a second portion bent connected to each other, the first portion is disposed in the housing, the second portion is exposed out of the housing, and the second portion extends toward and beyond the bottom surface.

In one embodiment of the disclosure, the first row of pins includes four sensing pins, the second row of pins includes six voltage pins, and the third row of pins includes six grounding pins.

In one embodiment of the disclosure, the expansion card assembly further includes a cooling fin, disposed on the expansion card body, wherein the top surface faces the cooling fin.

According to the second aspect of this disclosure, a connector is provided. The connector includes a housing and a plurality of pins. The housing includes a top surface, a bottom surface opposite to the top surface, and an engaging portion disposed on the bottom surface. The plurality of pins run through the housing. Each of the pins includes a first portion and a second portion bent connected to each other. The first portion is disposed in the housing. The second portion is exposed out of the housing. The second portion extends toward and beyond the bottom surface.

In one embodiment of the disclosure, the plurality of pins includes a first row of pins, and the first row of pins is closest to the top surface.

In one embodiment of the disclosure, the housing includes an extension portion extending from the top surface, and the extension portion covers the first row of pins.

In one embodiment of the disclosure, the connector is a PCI-E connector, the plurality of pins further includes a second row of pins and a third row of pins, and a number of pins in the first row of pins is less than a number of pins in the second row of pins and less than a number of pins in the third row of pins.

In one embodiment of the disclosure, the first row of pins includes four sensing pins, the second row of pins includes six voltage pins, and the third row of pins includes six grounding pins.

Based on the above, in the expansion card assembly of the disclosure, because the engaging portion is disposed on the bottom surface of the housing of the connector and is exposed out of the notch of the expansion card body, a user is allowed to operate the engaging portion at the bottom surface of the housing of the connector with fingers to connect the external power cord to or remove the external power cord from the connector. Compared with the related art where the engaging portion is disposed on the top surface of the housing of the connector and is close to the cooling fin of the expansion card body and the user is likely to get fingers scalded by the cooling fin when operating the engaging portion, the design of the engaging portion of the disclosure solves the above problems. Therefore, the expansion card assembly and the connector of the disclosure allow the user to connect the external power cord more conveniently.

To make the features and advantages of the disclosure more comprehensible, a detailed description of embodiments is given below with reference to the accompanying drawings.

DESCRIPTION OF REFERENCE NUMERALS

10: expansion card assembly;
100: expansion card body;
110: notch;
200: connector;
210: housing;
211: top surface;
212: bottom surface;
213: engaging portion;
214: extension portion;
220: pin;
221: first row of pins;
222: second row of pins;
223: third row of pins;
220A, 221A, 222A, 223A: first portion;
220B, 221B, 222B, 223B: second portion;
300: cooling fin.

DETAILED DESCRIPTION OF THE EMBODIMENTS

Figure 1:
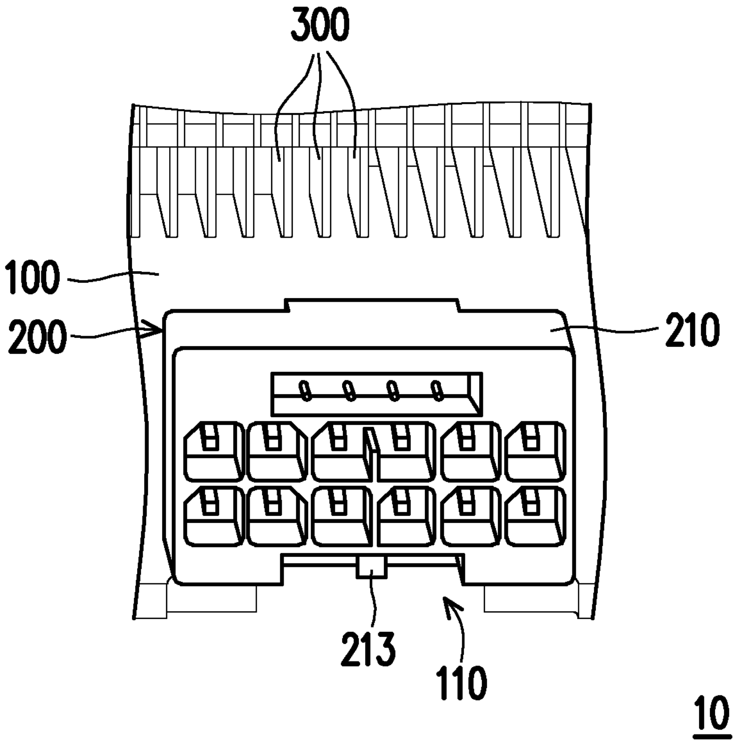
FIG. 1 is a partial three-dimensional diagram of an expansion card assembly according to an embodiment of the disclosure.
Figure 2:
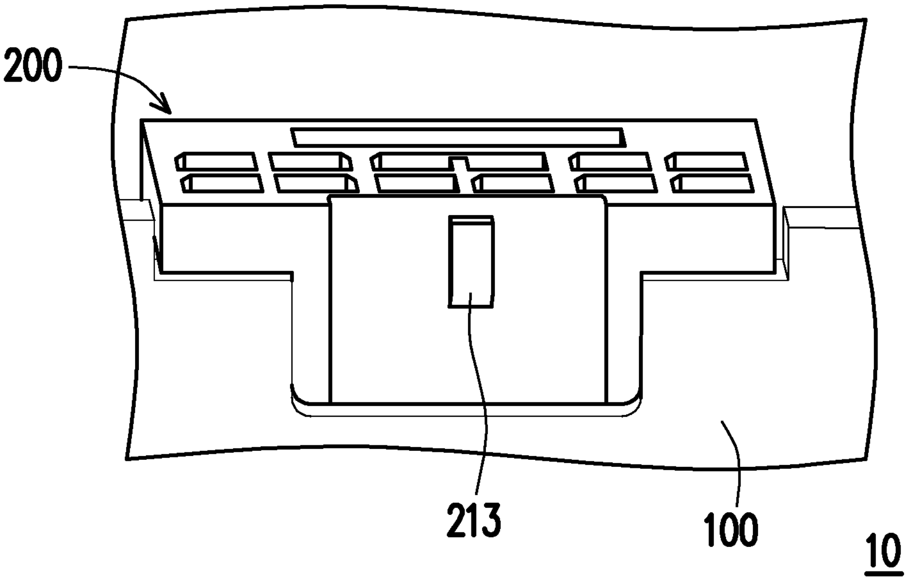
FIG. 2 is a bottom view of the expansion card assembly in FIG. 1.
Figure 3:
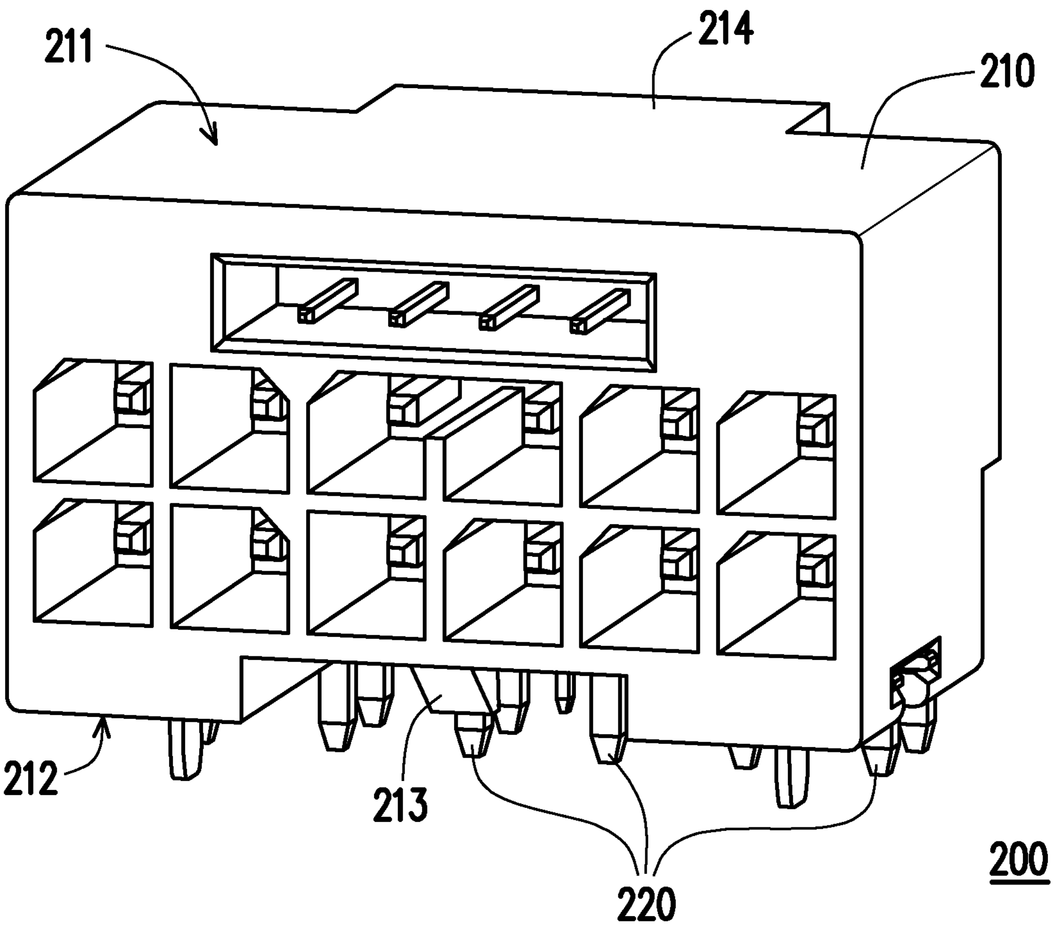
FIG. 3 is a three-dimensional diagram of a connector in FIG. 1.

Referring to FIG. 1 to FIG. 3, an expansion card assembly 10 according to an embodiment includes an expansion card body 100 and a connector 200. The expansion card body 100 includes a notch 110 recessed into an edge thereof. The connector 200 includes a housing 210. The housing 210 includes a top surface 211, a bottom surface 212 opposite to the top surface 211, and an engaging portion 213 disposed on the bottom surface 212. The engaging portion 213 is configured to connect the connector 200 to an external power cord (not shown). The bottom surface 212 is close to the expansion card body 100, and the engaging portion 213 is exposed out of the notch 110. In addition, the expansion card assembly 10 according to this embodiment further includes a cooling fin 300 disposed on the expansion card body 100, and the top surface 211 of the housing 210 faces the cooling fin 300.

With such a configuration, a user is allowed to operate the engaging portion 213 exposed out of the notch 110 at the bottom surface 212 of the housing 210 with fingers to connect the external power cord (not shown) to or remove the external power cord (not shown) from the connector 200. Because the engaging portion 213 in the disclosure is distant from the bottom surface 212 of the cooling fin 300, a sufficient operating space is provided for the user to connect the external power cord to or remove the external power cord from the connector 200, thereby reducing the risk that the user's fingers get scalded when operating the engaging portion 213, and improving the convenience and safety of operation for the user. In some other embodiments of the disclosure, the position of the cooling fin 300 is other components included in the expansion card assembly 10.

Figure 4:
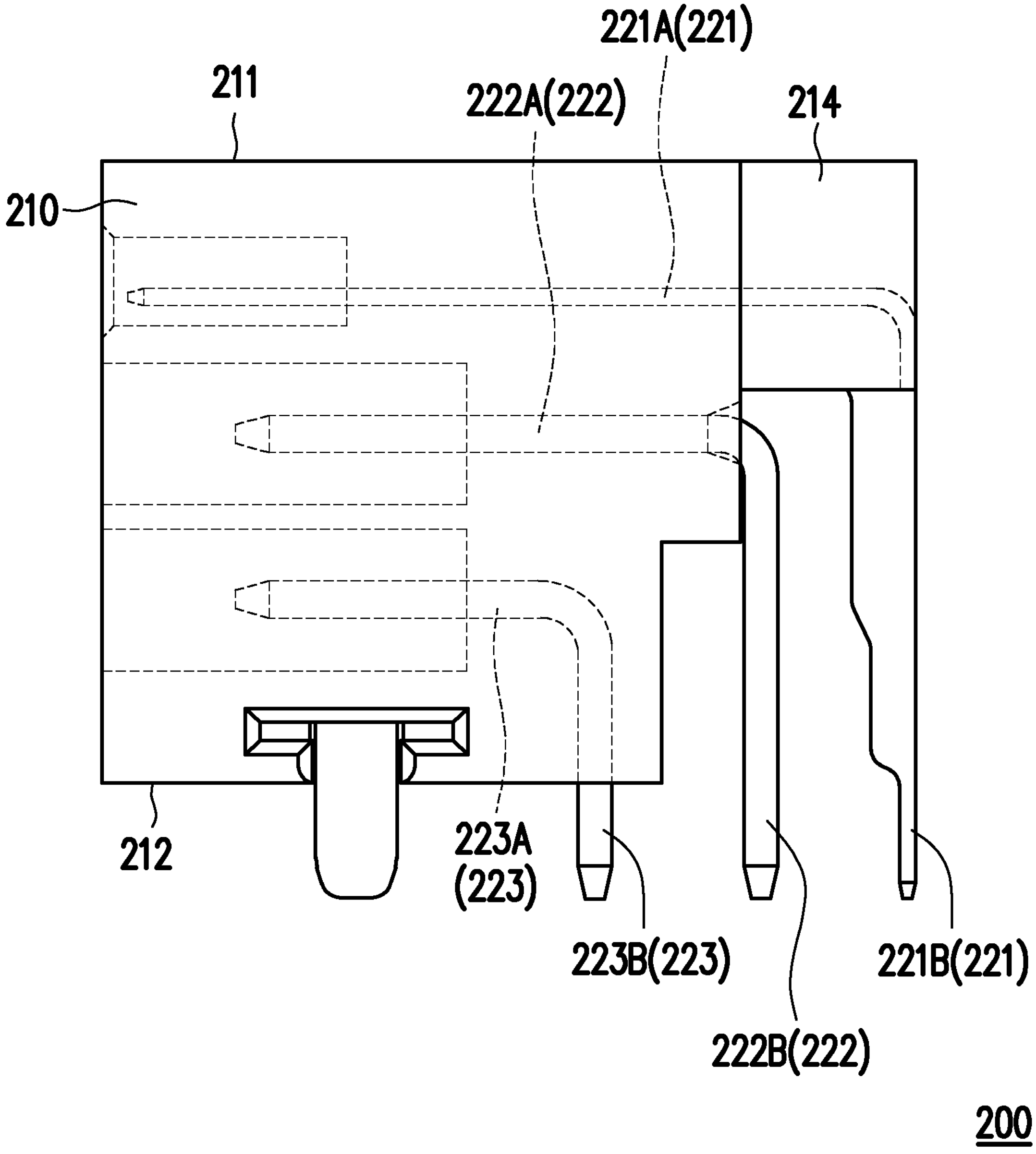
FIG. 4 is a side view of the connector in FIG. 3.
Figure 5:
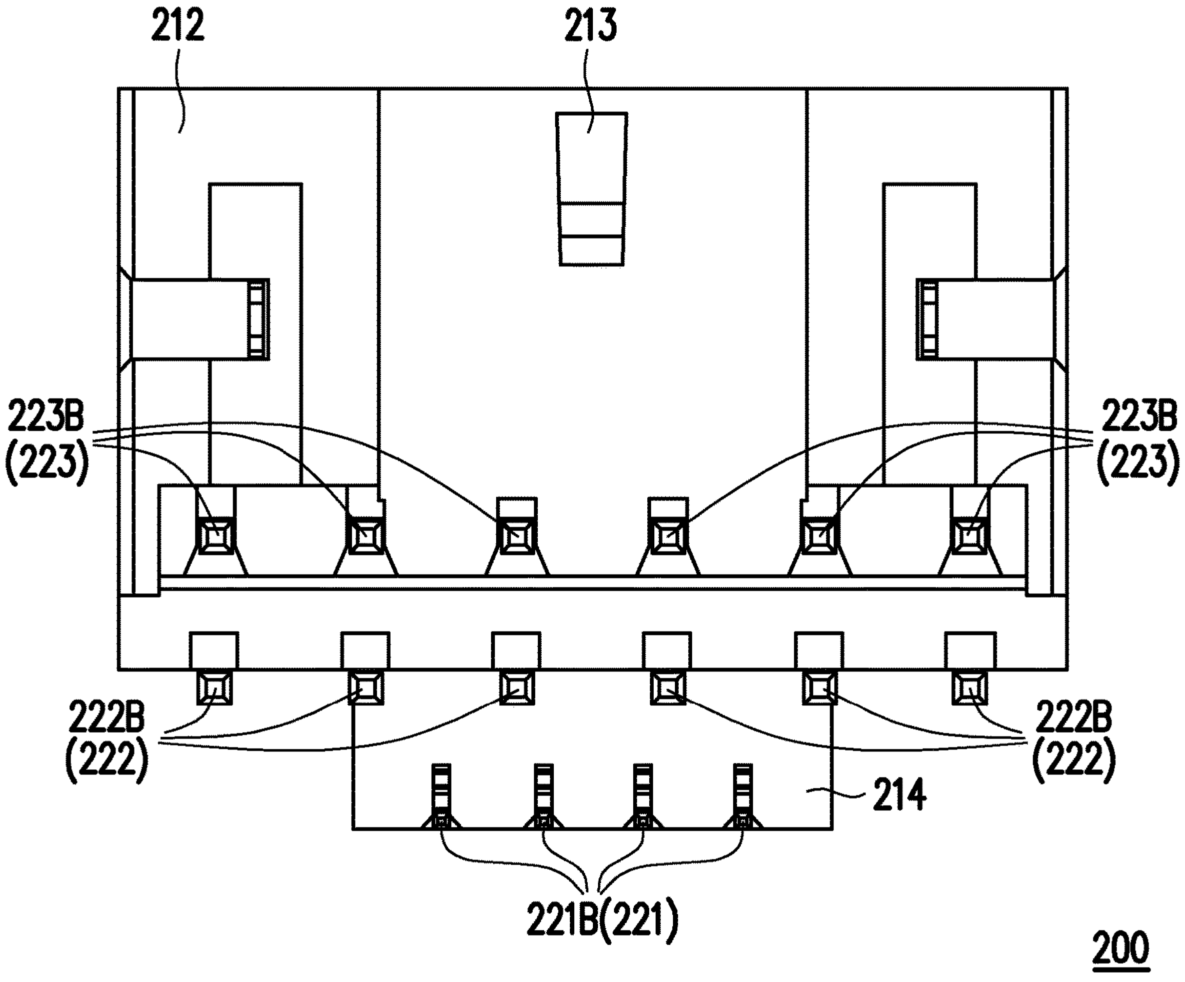
FIG. 5 is a bottom view of the connector in FIG. 3.

Referring to FIG. 3 to FIG. 5, the connector 200 includes a plurality of pins 220 running through the housing 210. The connector 200 is a PCI-E connector. The plurality of pins 220 includes a first row of pins 221, and the first row of pins 221 is closest to the top surface 211. In addition, the plurality of pins 220 further includes a second row of pins 222 and a third row of pins 223. As shown in FIG. 5, a number of pins in the first row of pins 221 is less than a number of pins in the second row of pins 222 and less than a number of pins in the third row of pins 223. The first row of pins 221 includes four sensing pins, the second row of pins 222 includes six voltage pins, and the third row of pins 223 includes six grounding pins. As shown in FIG. 4, a socket (not shown) on the external power cord corresponding to the first row of pins 221 is shallower than sockets (not shown) on the external power cord that correspond to the second row of pins 222 and the third row of pins 223, and the socket on the external power cord corresponding to the second row of pins 222 and the socket on the external power cord corresponding to the third row of pins 223 are of a same depth.

With such a configuration of the position of the engaging portion 213 and the arrangement of the pins 220 in the connector 200, the user rotates the external power cord (not shown) by 180 degrees and then connects the external power cord to the connector 200 of the disclosure. The user does not need to customize a special external power cord in order to adapt to the position of the engaging portion 213 and the arrangement of the pins 220 in the connector 200. The connector 200 of the disclosure effectively overcomes the difficulties encountered by the user when connecting or disconnecting an external power cord to or from an existing connector without increasing the costs.

In this embodiment, as shown in FIG. 4, each of the pins 220 includes a first portion 220A and a second portion 220B bent connected to each other. The first portion 220A is disposed in the housing 210, and the second portion 220B is exposed out of the housing 210. The second portion 220B extends toward and beyond the bottom surface 212. The second portion 220B extending beyond the bottom surface 212 is configured to connect to the expansion card body 100, so that the connector 200 is disposed on the expansion card body 100. The first portions 220A include first portions 221A of the first row of pins 221, first portions 222A of the second row of pins 222, and first portions 223A of the third row of pins 223. The second portions 220A include second portions 221A of the first row of pins 221, second portions 222A of the second row of pins 222, and second portions 223A of the third row of pins 223.

In this embodiment, the second portions 222B of the second row of pins 222 are completely exposed out of the housing 210, and a part of each of the second portions 223B of the third row of pins 223 that is configured to connect to the expansion card body 100 is exposed out of the housing 210. In some other embodiments of the disclosure, the shape of the housing 210 is adjusted, a part of each of the second portion 222B of the second row of pins 222 that is configured to connect to the expansion card body 100 is exposed out of the housing 210, and the second portions 223B of the third row of pins 223 are completely exposed out of the housing 210. In addition, in this embodiments, widths of the second portions 221B beyond an extension portion 214 of the first row of pins 221 decrease in a stepwise manner along a direction from the top surface 211 to the bottom surface 212 of the housing 210. In some other embodiments of the disclosure, the widths of the second portions 221B beyond the extension portion 214 of the first row of pins 221 are the same.

Figure 6:
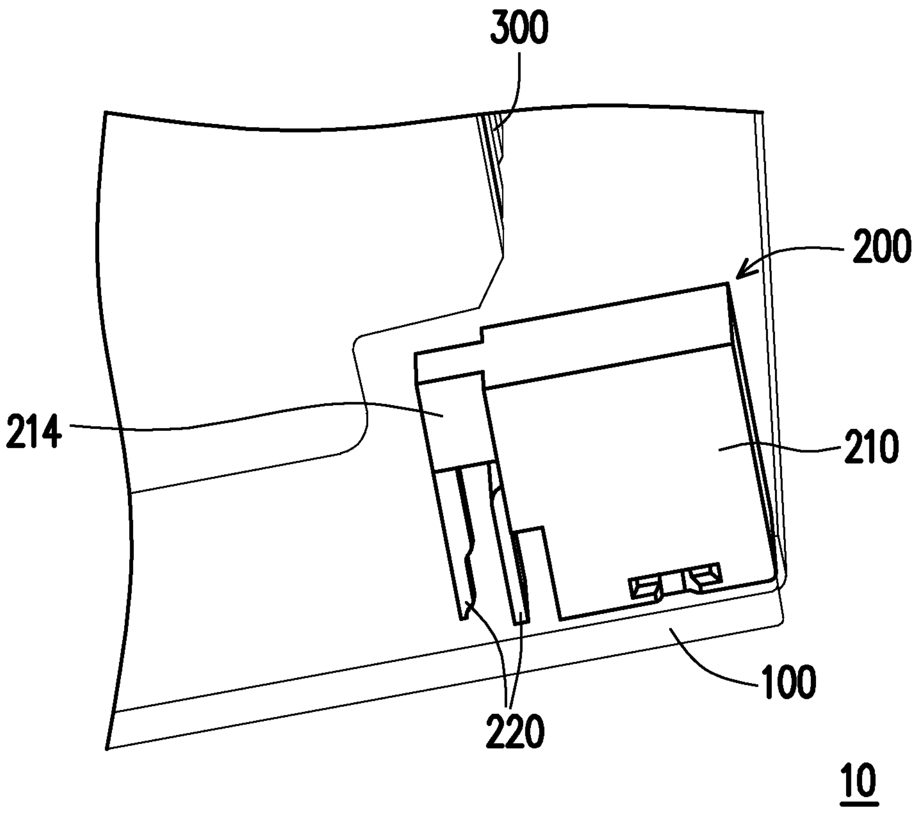
FIG. 6 is a partial side view of the expansion card assembly in FIG. 1.

Referring to FIG. 4 and FIG. 6, the housing 210 of the connector 200 of the embodiments includes an extension portion 214 extending from the top surface 211. The extension portion 214 extends along the first portions 221A of the first row of pins 221, and completely covers the first portions 221A of the first row of pins 221 and partially covers the second portions 221B of the first row of pins 221. Therefore, the first portions 221A and the second portions 221B of the first row of pins 221 that are close to the cooling fin 300, though exposed out of the housing 210, are not in contact with the cooling fin 300, thereby effectively reducing the risk that the first portions 221A or the second portions 221B come into contact with the cooling fin 300 to short circuit the expansion card assembly 10. In this embodiment, the extension portion 214 partially covers the second portions 221B of the first row of pins 221 and does not cover the second row of pins 222. In some other embodiments of the disclosure, the extension portion 214 extends toward the bottom surface 212 and cover the second portions 222B of the second row of pins 222 and a larger part of the second portions 221B of the first row of pins 221.

Based on the above, in the expansion card assembly of the disclosure, because the engaging portion is disposed on the bottom surface of the housing of the connector and is exposed out of the notch of the expansion card body, a user is allowed to operate the engaging portion at the bottom surface of the housing to connect the external power cord to or remove the external power cord from the connector. Compared with the related art where the engaging portion is disposed on the top surface of the housing of the connector and is close to the cooling fin of the expansion card body and the user does not easily connect the external power cord to or remove the external power cord from the connector with fingers but is likely to get fingers scalded by the cooling fin when operating the engaging portion, the design of the engaging portion of the disclosure solves the above problems, thereby improving the convenience and safety of operation for the user. In addition, the position of the engaging portion and the arrangement of pins in the disclosure are reverse to those in the prior art, allowing the user to rotate an external power cord designed for connecting to an existing connector by 180 degrees and connect the external power cord to the connector of the disclosure, thereby effectively reducing the risk that the user gets scalded by the cooling fin due to the difficulty for the user to connect the external power cord to or remove the external power cord from the connector or operate the engaging portion, without increasing the costs. Furthermore, the expansion card assembly of the disclosure includes the extension portion extending from the top surface of the housing and covering the first row of pins, to prevent the first row of pins from contacting the cooling fin nearby, thereby reducing the risk that the first portions or the second portions of the first row of pins come into contact with the cooling fin 300 to short circuit the expansion card assembly.

It is to be noted that the foregoing embodiments are merely used for describing the technical solutions of the disclosure, but are not intended to limit the disclosure. Although the disclosure has been described in detail with reference to the foregoing embodiments, a person of ordinary skill in the art should understand that modifications to the technical solutions set forth in the foregoing embodiments or equivalent replacements to some or all of the technical features are possible, as long as such modifications or replacements do not cause the essence of the corresponding technical solutions to depart from the scope of the technical solutions in the embodiments of the disclosure.

What is claimed is:

1. An expansion card assembly, comprising:

an expansion card body, comprising two planes opposite to each other, a plurality of edges connected between the two planes, and a notch recessed into one of the edges thereof and penetrated through the two planes;

a connector, comprising a housing, wherein the housing comprises a top surface, a bottom surface opposite to the top surface, and an engaging portion disposed on the bottom surface, the bottom surface is close to the expansion card body, and the engaging portion faces toward the notch and is exposed out of the notch, wherein the engaging portion does not contact any of inner walls of the notch of the expansion card body, the top surface is a surface of the housing that is farthest from the expansion card body; and a cooling fin, disposed on the expansion card body, wherein the top surface of the housing of the connector faces the cooling fin, the engaging portion of the housing of the connector is distant from a bottom surface of the cooling fin.

2. The expansion card assembly according to claim 1, wherein the connector comprises a plurality of pins running through the housing, the plurality of pins comprises a first row of pins, and the first row of pins is closest to the top surface.

3. The expansion card assembly according to claim 2, wherein the housing comprises an extension portion extending from the top surface, and the extension portion covers the first row of pins.

4. The expansion card assembly according to claim 2, wherein the plurality of pins further comprises a second row of pins and a third row of pins, and a number of pins in the first row of pins is less than a number of pins in the second row of pins and less than a number of pins in the third row of pins.

5. The expansion card assembly according to claim 2, wherein each of the plurality of pins comprises a first portion and a second portion bent connected to each other, the first portion is disposed in the housing, the second portion is exposed out of the housing, and the second portion extends toward and beyond the bottom surface.

6. The expansion card assembly according to claim 4, wherein the first row of pins comprises four sensing pins, the second row of pins comprises six voltage pins, and the third row of pins comprises six grounding pins.

* * * * *